United States Patent [19]

Archer

[11] Patent Number: 4,603,885
[45] Date of Patent: Aug. 5, 1986

[54] APPARATUS AND STRUCTURE FOR JOINING PIPE

[75] Inventor: Lee A. Archer, Asheville, N.C.

[73] Assignee: Akzona Incorporated, Asheville, N.C.

[21] Appl. No.: 636,767

[22] Filed: Aug. 1, 1984

Related U.S. Application Data

[62] Division of Ser. No. 276,134, Jun. 22, 1981, Pat. No. 4,488,346.

[51] Int. Cl.⁴ ............................................. F16L 21/00
[52] U.S. Cl. ..................................... 285/18; 285/382; 285/417; 29/421 E
[58] Field of Search ................... 285/382.2, 382, 18, 285/369, 417; 29/421 E

[56] References Cited

U.S. PATENT DOCUMENTS

| | | | |
|---|---|---|---|
| 2,995,053 | 8/1961 | Freedom | 29/421 E X |
| 3,114,566 | 12/1963 | Coberly et al. | 285/381 X |
| 3,477,750 | 11/1969 | Powell | 285/382 X |
| 3,661,004 | 5/1972 | Lee et al. | 29/421 E X |
| 3,675,949 | 7/1972 | Dawson | 285/382.2 X |
| 3,827,727 | 8/1974 | Moebius | 285/382.2 X |
| 3,915,480 | 10/1975 | Kish et al. | 285/382 X |
| 3,956,815 | 5/1976 | Capper et al. | 285/382.2 X |
| 4,064,614 | 12/1977 | Horvath | 285/382 X |
| 4,135,743 | 1/1979 | Hughes | 285/381 |
| 4,198,081 | 4/1980 | Harrison et al. | 285/381 |
| 4,228,941 | 10/1980 | Persson | 285/382.2 X |
| 4,325,571 | 4/1982 | Funderburg et al. | 285/382.2 X |
| 4,327,471 | 5/1982 | Whitted, III | 285/382 X |
| 4,328,982 | 5/1982 | Christianson | 285/382.2 X |

Primary Examiner—Thomas F. Callaghan
Attorney, Agent, or Firm—Tom R. Vestal; David M. Carter; Francis W. Young

[57] ABSTRACT

A pipe and sleeve telescoped joint with the pipe and sleeve in sealing engagement and keys embedded in both pipe and sleeve at their interface. The size and number of the keys are calculated from the size and strength of the pipe. The sleeve is sized and its strength selected from the strength of the pipe, and the sleeve ends are shaped to hold the joint circular when it is made. The apparatus includes means for holding the midportion of the sleeve circular when creating the joint, and for cooperating with the sleeve ends to keep them circular. The sealing engagement is created by firing a propellant into a substantially incompressible medium, like water, held by the apparatus in a cavity about the sleeve, and a piston separates the explosive propellant from the pressure medium.

5 Claims, 9 Drawing Figures

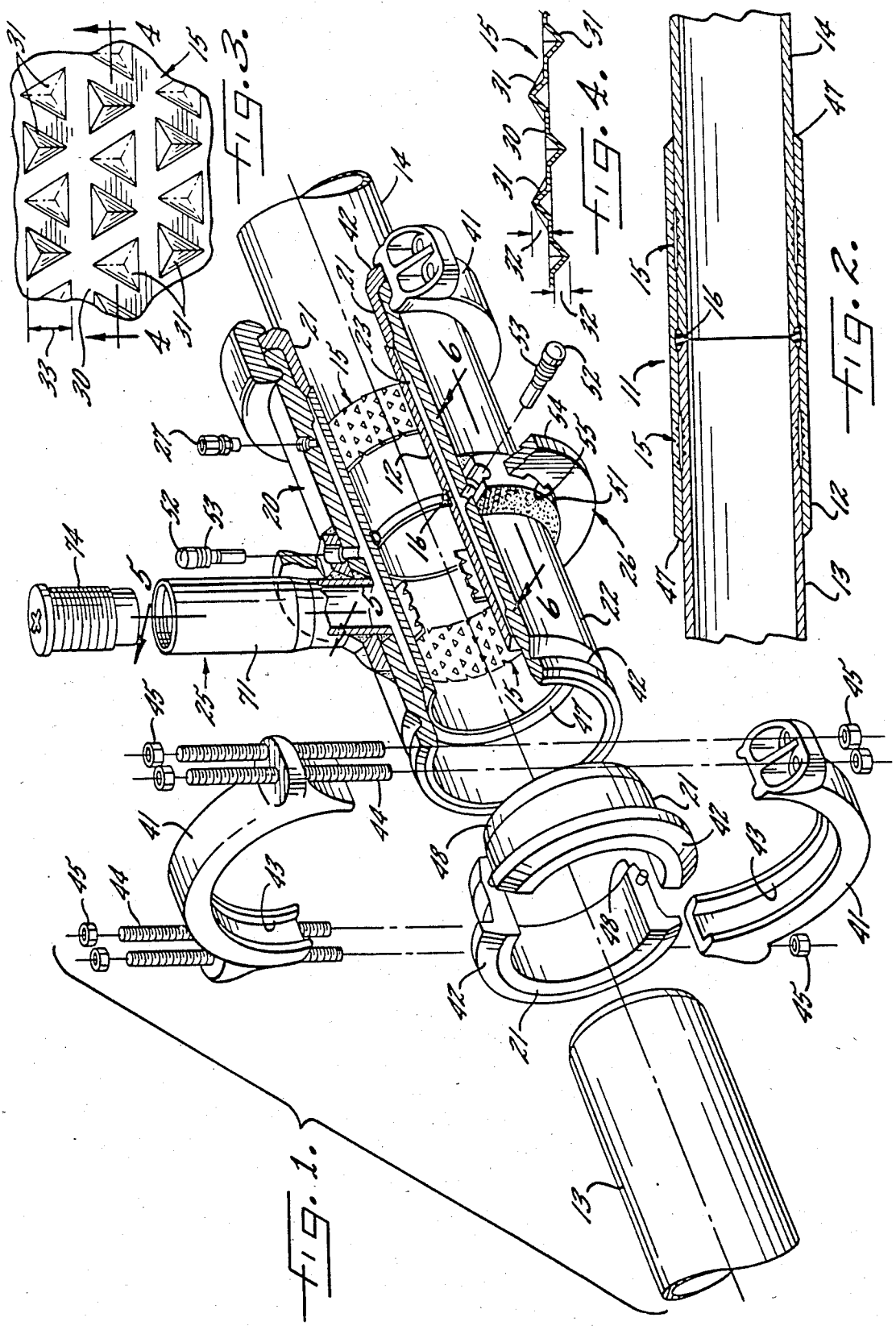

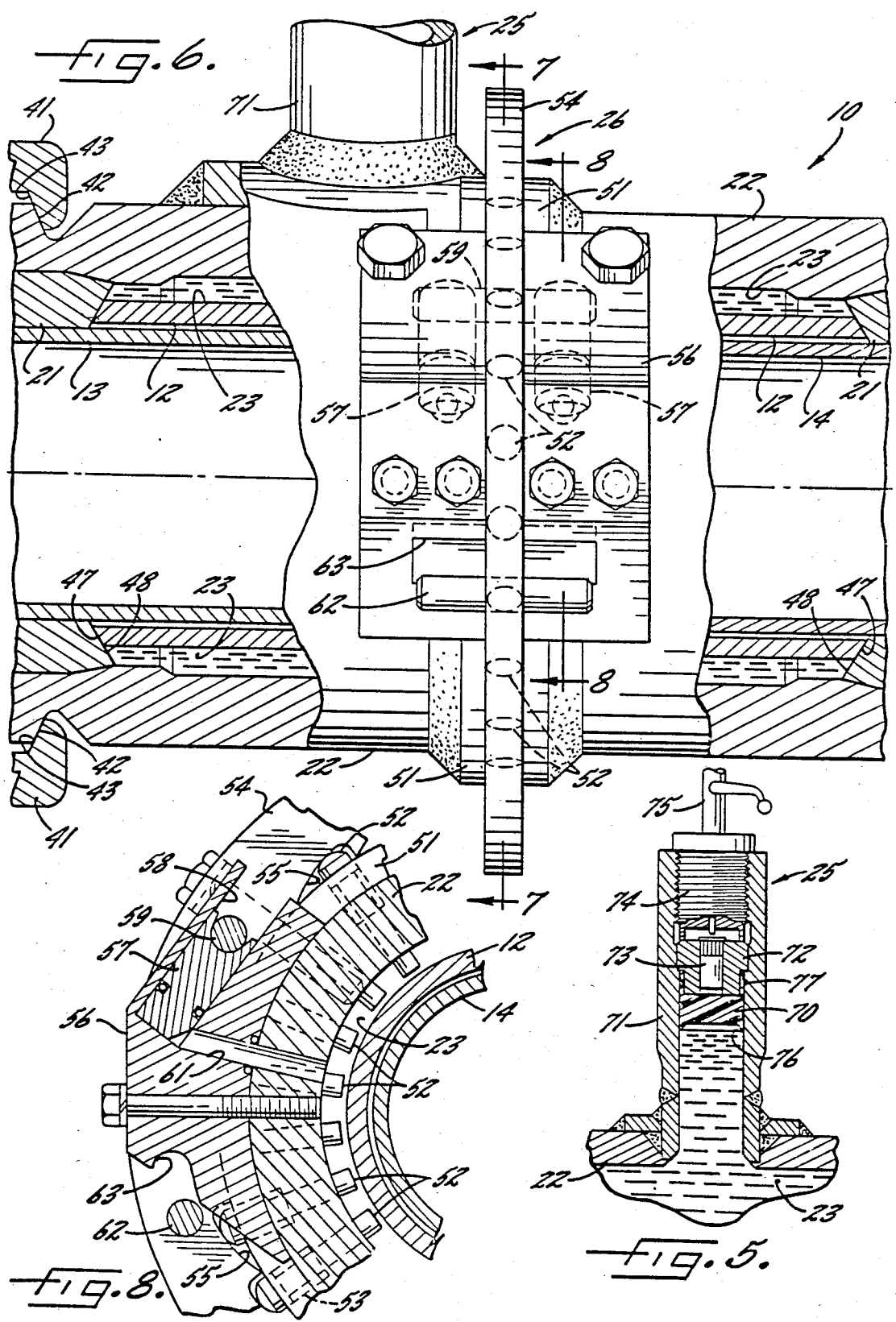

4,603,885

APPARATUS AND STRUCTURE FOR JOINING PIPE

This is a division of application Ser. No. 276,134, filed June 22, 1981, now U.S. Pat. No. 4,488,346.

BACKGROUND OF THE INVENTION

This invention relates generally to joining lengths of pipe and more particularly concerns methods, structure and apparatus for securing a sleeve to a pipe so as to create a pipe splice.

In lieu of welding lengths of pipe to form a pipe line, a method and apparatus for splicing pipe lengths using sleeves to overlap and join pipe length ends is disclosed in United States U.S. Pat. Nos. 4,327,471 and 4,330,918. This technique involves using a short, cylindrical sleeve to span abutted ends of pipe lengths, and then exerting very high propellant forces to drive the sleeve against the pipe beyond the elastic limit of the sleeve but within the elastic limit of the pipe. Upon dissipation of the propellant force, the pipe elastically returns and the pipe and sleeve are intimately joined.

A technically successful joint of this kind should ideally be stronger than the pipe itself in the sense of resisting longitudinal pull-out, and pull-out or separation as a result of bending the pipe line at the joint. In addition, a commercially successful joint of this kind should be designed to use sleeves and propellant force-creating charges of minimum size and cost, consistent with achieving the necessary technical standards.

OBJECTS OF THE INVENTION

Accordingly, a primary aim of the invention is to provide a sleeve and pipe joint having superior mechanical strength without great overlapping sleeve length. A related object is to provide such a joint that is reliably held in the original circular configuration of the pipe and sleeve so as to maintain structural integrity.

Another object is to provide a joint as characterized above efficiently using explosive propellant material to safely and economically develop the required propellant forces to create the joint.

BRIEF DESCRIPTION OF THE DRAWINGS

Other objects and advantages of the invention will become apparent upon reading the following detailed description and upon reference to the drawings, in which:

FIG. 1 is a perspective, partially exploded and partially broken away, of an apparatus and structure for creating a pipe joint embodying the present invention;

FIG. 2 is a fragmentary longitudinal section of a join embodying the invention;

FIG. 3 is an enlarged fragmentary plan of an element of the structure shown in FIGS. 1 and 2;

FIG. 4 is a section taken approximately along the line 4—4 in FIG. 3;

FIG. 5 is an enlarged fragmentary section taken approximately along the line 5—5 in FIG. 1;

FIG. 6 is a section taken approximately along the line 6—6 in FIG. 1;

FIG. 8 is a fragmentary section taken approximately along the line 8—8 in FIG. 6.

DETAILED DESCRIPTION OF THE DRAWINGS

Figure 7:
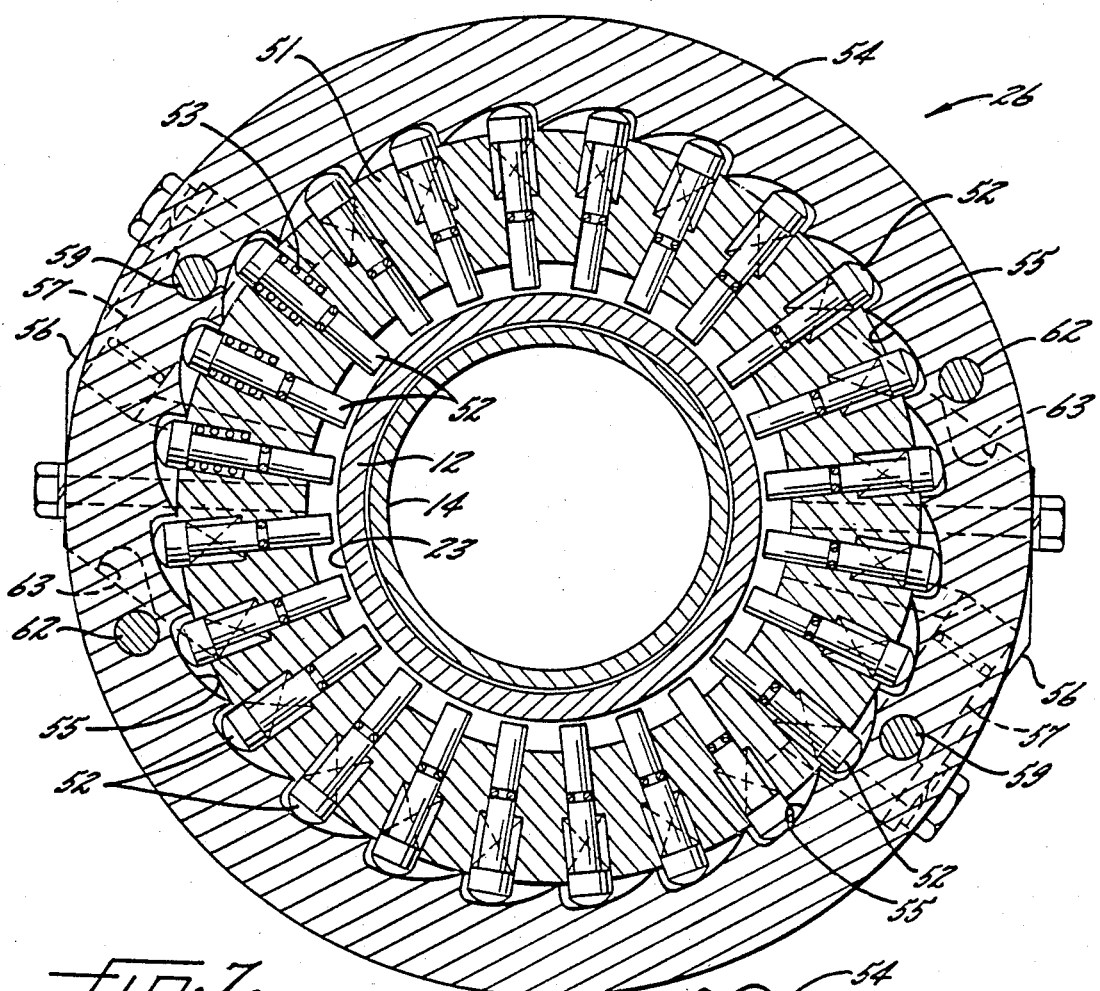
FIG. 7 is a section taken along the line 7—7 in FIG. 6.

While the invention will be described in connection with preferred embodiments, it will be understood that I do not intend to limit the invention to those embodiments. On the contrary, I intend to cover all alternatives, modifications, and equivalents as may be included within the spirit and scope of the invention as defined by the appended claims.

Turning now to the drawings, there is shown in FIG. 1 an apparatus 10 for forming a pipe joint 11 appearing in section in FIG. 2. The joint 11 consists of a sleeve 12 and the ends of lengths of pipe 13 and 14 telescoped and driven radially together. Keys 15 are embedded in the material of the sleeve 12 and the pipe 13, 14 at their interfaces. Preferably, an annular seal 16 is compressed between the ends of the pipe 13, 14 and the sleeve 12 to insure a gas tight joint.

The apparatus 10 includes a chamber 20 for confining a substantially incompressible medium with the chamber being defined by end members 21 and a cylindrical body 22, sealed between the end members 21, to create an annular cavity 23 surrounding the sleeve 12 and confining the medium when the joint is made. Mounted on the body 22 are an assembly 25 for firing a propellant into the chamber 20 and a holding assembly 26, whose function will be described below.

Operation of the apparatus 10 is generally like that described in above-identified U.S. Pat. Nos. 4,327,471 and 4,330,918. The sleeve 12 is placed in the cavity 23 and the ends of the pipe 13, 14 are abutted in the sleeve. The cavity is filled with a substantially incompressible medium such as water through a valve 27. A charge of propellant, as opposed to a detonating explosive, is fired into the water medium, causing a pressure build-up exceeding the yield strength of the sleeve 12, whereupon the sleeve is, in effect, shrunk onto the pipe ends to form the joint 11.

In carrying out the present invention, for pipe of a given diameter and wall thickness, the sleeve 12, essentially a cylindrical body, is given a diameter that closely fits the diameter of the pipe, a wall thickness that is greater than the pipe wall thickness, and a yield strength that is less than the yield strength of the pipe material. As illustrated, the inner diameter of the sleeve body fits closely the outer diameter of the pipe 13, 14, although the reverse can be true for this aspect of the invention. For example, the pipe could be made of a lower yield strength material than the sleeve. In that case, the propelled expansion would occur on the inside of the pipe with the yield strength of the pipe being exceeded and the yield strength of the sleeve not being exceeded. Thus, the softer pipe material would be expanded into the larger sleeve, forming a joint, as contemplated herein.

Referring again to the previous case, by making the yield strength of the sleeve less, a propellant force can be calculated that will, in the formation of the joint 11, exceed the sleeve yield strength and permanently shrink the sleeve while the pipe will, when the propellant force is dissipated, return to its original size. This produces the interference fit of the joint. By making the sleeve slightly thicker, the mechanical strength of the joint 11 remains approximately equal to the mechanical strength of the pipe itself.

Preferably, the sleeve material is metallurgically matched to the material of the pipe so as to minimize electrolytic corrosion between the materials. In a practical case, both sleeve and pipe can be welded carbon steel pipe.

In accordance with the invention, the keys 15 embedded in the sleeve 12 and pipe 13, 14 are dimensioned so as not to enter the pipe surface a distance greater than the allowable discontinuity for rating the pipe, and the size and number of the keys per unit area times the ultimate strength of the pipe material is less than the unit area force exerted by the propelling force when making the joint. Preferably, the keys 15 are formed as a band 30 from which are raised, from both sides, the actual key elements 31 preferably shaped substantially like equilateral pyramids. However, the keys could be machined into the sleeve. The material of the keys 15 must be harder than the materials of the sleeve and pipe, and tungsten carbide is suitable.

To understand the size and spacing relationships referred to above, it would be helpful to consider some background. Pipe is strength-rated at a thickness 12.5% less than its nominal thickness. Thus, cutting a pipe thread less than that dimension will not derate the pipe. The height 32 of the key pyramid elements 31 is therefore not greater than 12.5% of the thickness of the pipe with which they are to be used. Taking X-42 welded steel pipe with a 6⅝ inch outer diameter and a 0.188 inch wall thickness, the height 32 should not be over 0.0235 inches.

X-42 pipe has a maximum ultimate strength of approximately 60,000 psi. A key pyramid element 31 of a given height has a given base area, and hence a given unit force will be required to drive such a key into the pipe material. In the example being discussed, about 24 pounds of force is needed to drive an equilateral pyramid of that size into X-42 steel pipe. The spacing of the key elements is therefore limited by the individual key force figure and the unit area force developed by the propellant in the apparatus 10. A radial pressure of 3,000 psi is available for seating the key elements at the pipe yield point. This therefore limits the key element spacing to no more than on the order of 125 elements 31 per square inch.

A final selection in designing the keys 15, after individual key element size and spacing is determined, is how many total key elements should be provided. Preferably, that number should be such that the projected area of all key elements longitudinally of the pipe, that is, the height 32 taken with a dimension 33, is greater than the pipe cross sectional area. Returning to the example being discussed, a key band 30 about 3 to 6 inches wide should provide sufficient pyramid element area, with the result being that the key locked strength of the joint 11 is equal to or greater than the tensile yield strength of the pipe itself.

As a result of utilizing keys 15 of the size and shape discussed, the joint 11 is substantially equal to the strength of the pipe itself in terms of linear pull-out resistance and resistance to failure upon bending. It will also be apparent from the foregoing that in the drawings the relative sizes of the keys 15 have been exaggerated for clarity of illustration.

It has been found that the optimal sleeve length, for strength purposes of the resulting joint and to minimize material usage in the sleeve, is between two and three times the outer diameter of the pipe. Using this range of sleeve dimensions, the resulting joint will resist bending equivalent with the remainder of the pipe.

Turning to the apparatus 10, the end members 21 are split into two half sections and clamps 41 are provided for both pulling the sections 21 solidly into place about the pipe 13, 14, and drawing the half sections against the body 22. The sections of the end members 21 and the body 22 are formed with tapered surfaces 42 which are cammed by tapered wall grooves 43 in the clamps 41. Thus, drawing the clamps 41 together using bolts 44 and nuts 45 both draws the end member 21 half sections together, as well as pulls the end members firmly against the body 22.

An important aspect of the joint 11 is roundness; i.e., keeping the sleeve 12 and pipe 13, 14 truly cylindrical during the making of the joint 11. In keeping with the invention, the sleeve 12 is formed with tapered ends 47 defining sections of outer cylindrical surfaces, and the end members 21 have tapered surfaces 48 defining sections of inner conical surfaces which are drawn firmly against the sleeve ends 47 as the clamps 41 are tightened. When the propellant is fired to radially shrink the sleeve 12, one result is to slightly expand the sleeve longitudinally, thereby causing the tapered surfaces 47, 48 to forcibly cam the sleeve ends into circularity.

Figure 9:
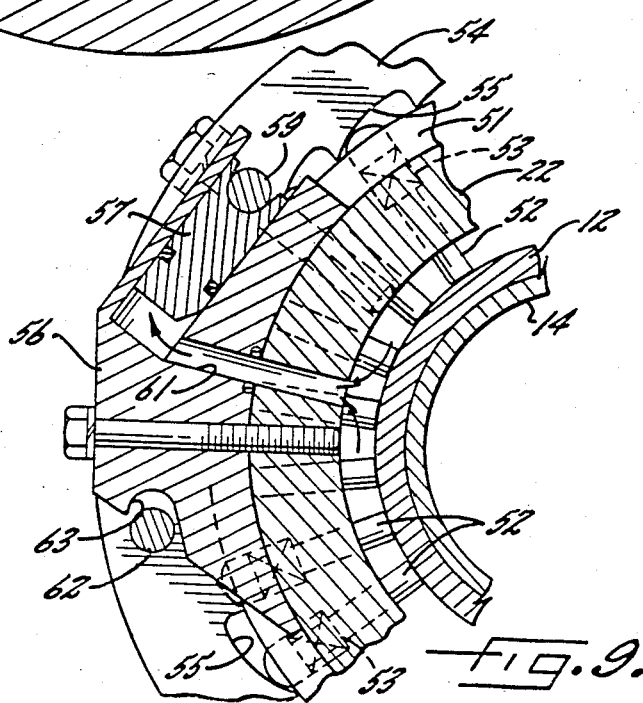
FIG. 9 is similar to FIG. 8, but shows the parts in a different operating position.

As a feature of the invention, the holding assembly 26 acts to engage the sleeve 12 at a midportion so as to hold its circularity at this region. The assembly 26 includes a chamber band 51 secured to the body 22 and mounting a plurality of holding pins 52 biased outwardly by springs 53 but extending into the cavity 23 around the sleeve 12. Surrounding the pins 52 is a cam ring 54, having a camming surface 55 for each pin 52, mounted for limited rotation between blocks 56 bolted to the band 51 and the body 22. Two sets of blocks 56 are provided on opposite sides of the body 22 (see FIG. 7). It will be apparent that upon limited rotation of the ring 54, clockwise in FIGS. 7, 8 and 9, the pins 52 will be driven radially inward to firmly engage the sleeve 12 and hold it uniformly circular.

The cam ring 54 is driven by actuators responsive to firing of the propellant. The actuators include a piston 57 fitted in a chamber 58 in each of the blocks 56, with the pistons 57 engaging pins 59 mounted in the ring 54. Passages 61 through the body 22 and blocks 56 connect the backs of the pistons 57 with the cavity 23 and the water in that cavity. When the propellant is fired, the pressure buildup in the water drives the pistons 57 to rotate the cam ring 54 (see FIG. 9) at the same time that the sleeve 12 is being shrunk, thus maintaining midpoint circularity of the joint 11. Second pins 62 on the cam ring 54 provide force points for manually returning the ring after firing, and also cooperate with notches 63 in the blocks 56 to limit ultimate ring rotation.

Another feature of the invention is to provide more controlled propellant force in the cavity 23 by firing through a piston 70 forming part of the firing assembly 25. The assembly 25 includes a barrel tube 71 containing a chamber member 72 adapted to receive a cartridge 73. A plug 74 mounting a bolt action firing pin mechanism 75 is threaded into the end of the tube 71. The piston 70, preferably a thick plastic member having a seal lip 76 and a guiding skirt 77 fitted on the chamber member 72, is interposed between the cartridge 73 and the water in the cavity 23. Obviously, water is introduced through the valve 27 before the piston 70, chamber member 72, and plug 74 are sealed in the tube 71 so that water fills the barrel tube without a trapped air pocket. Firing of the cartridge 73 thus directly and immediately drives the piston 70 into the incompressible medium and generates the required propellant force.

Use of the piston 70 keeps the propellant charge out of the water, which would serve as a cooling medium, and permits better gas generation and more uniform pressure upon firing of the cartridge 73. Also, the maintenance of the pack pressure behind the piston insures ignition of all of the powder of the cartridge and gives more predictable burning rates. Referring to the example described above, the 9–10,000 psi pressure in the cavity 23 can be produced using a cartridge containing about 16 grams of relatively slow burning number 4756 gun powder.

I claim as my invention:

1. A pipe joint, comprising two abutted ends of pipe of given diameter; a sleeve interfacing with and surrounding the ends, the yield strength of the sleeve being less than the yield strength of the ends; means for temporarily applying a propellant force substantially along the length of the outer surface of said sleeve and means for containing said propellant force above the sleeve, said propellant force being sufficient to collapse the sleeve around the pipe to form a seal, but insufficient to permanently distort the pipe; and keys embedded in the sleeve and pipe ends at their interface, said keys being dimensioned so as not to enter the surface of said pipe a distance greater than the allowable surface discontinuity for rating said pipe, the size and number of said keys per unit area times the ultimate strength of the pipe material being less than the unit area force exerted by said propellant force.

2. The joint of claim 1, wherein said means for temporarily applying a propellant force and means for containing said propellant force are removable from said pipe ends and sleeve.

3. The joint of claim 1, wherein the length of said sleeve is two to three times the diameter of said pipe.

4. The joint of claim 1, in which the sleeve material is metallurgically matched to the material of said pipe so as to minimize electrolytic corrosion between said materials.

5. The joint of claim 4 in which the materials are welded carbon steel pipe.

* * * * *